(12) United States Patent
Ganiger et al.

(10) Patent No.: US 11,603,799 B2
(45) Date of Patent: Mar. 14, 2023

(54) COMBUSTOR FOR A GAS TURBINE ENGINE

(71) Applicant: General Electric Company, Schenectady, NY (US)

(72) Inventors: Ravindra Shankar Ganiger, Bangalore (IN); Hiranya Kumar Nath, Bangalore (IN); Michael Anthony Benjamin, Cincinnati, OH (US); Rajendra Mahadeorao Wankhade, Bangalore (IN); Gurunath Gandikota, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/130,040

(22) Filed: Dec. 22, 2020

(65) Prior Publication Data
US 2022/0195931 A1   Jun. 23, 2022

(51) Int. Cl.
| | | |
|---|---|---|
| *F23R 3/28* | (2006.01) | |
| *F02C 7/24* | (2006.01) | |
| *F02C 7/22* | (2006.01) | |

(52) U.S. Cl.
CPC ............ *F02C 7/24* (2013.01); *F02C 7/22* (2013.01); *F23R 3/28* (2013.01); *F23R 3/283* (2013.01); *F05D 2220/32* (2013.01); *F05D 2230/31* (2013.01); *F05D 2240/35* (2013.01); *F05D 2260/20* (2013.01); *F05D 2260/231* (2013.01)

(58) Field of Classification Search
CPC .... F23R 3/002; F23R 3/60; F23R 3/28; F23R 3/283; F23R 3/286
See application file for complete search history.

(56) References Cited

U.S. PATENT DOCUMENTS

| | | | |
|---|---|---|---|
| 4,322,945 A | 4/1982 | Peterson et al. | |
| 5,496,045 A | 3/1996 | Millener et al. | |
| 5,509,270 A | 4/1996 | Pearce et al. | |
| 6,032,457 A | 3/2000 | McKinney et al. | |
| 6,547,256 B2 | 4/2003 | Aksit et al. | |
| 6,799,765 B2 | 10/2004 | Beichl | |
| 7,481,248 B2 | 1/2009 | Prociw et al. | |
| 8,028,996 B2 | 10/2011 | Ruggiero et al. | |
| 9,644,843 B2 * | 5/2017 | Herborth | F23R 3/002 |
| 10,830,436 B2 * | 11/2020 | Lao | F23R 3/002 |
| 11,015,807 B2 * | 5/2021 | Lao | F02C 6/08 |
| 11,175,041 B2 * | 11/2021 | Quach | F23R 3/007 |
| 2006/0117755 A1 * | 6/2006 | Spooner | F23R 3/002 60/752 |

(Continued)

*Primary Examiner* — Todd E Manahan
*Assistant Examiner* — Thuyhang N Nguyen
(74) *Attorney, Agent, or Firm* — Venable LLP; Elizabeth C. G. Gitlin; Michele V. Frank (57) ABSTRACT

A combustor for a gas turbine engine includes an inner liner and an outer liner positioned outward of the inner liner along the radial direction such that a combustion chamber is defined between the inner and outer liners. Furthermore, the combustor includes a fuel nozzle configured to supply fuel to the combustion chamber. Moreover, the combustor includes a bristle pack having a base plate and a plurality of bristles extending outward from the base plate such that the bristle pack forms at least a portion of at least one of a heat shield coupled to the fuel nozzle, a deflector of the combustor, or a flare of the combustor.

20 Claims, 8 Drawing Sheets

(56) References Cited

U.S. PATENT DOCUMENTS

| | | | |
|---|---|---|---|
| 2009/0145581 A1* | 6/2009 | Hoffman | F28F 3/14 165/80.3 |
| 2014/0144158 A1* | 5/2014 | Sha | F16J 15/3288 415/170.1 |
| 2016/0109130 A1* | 4/2016 | Stastny | B23K 26/1464 219/76.1 |

* cited by examiner

COMBUSTOR FOR A GAS TURBINE ENGINE

FIELD

The present disclosure generally pertains to gas turbine engines, and, more specifically, to a combustor for a gas turbine engine.

BACKGROUND

A gas turbine engine generally includes a compressor section, a combustion section, and a turbine section. More specifically, the compressor section progressively increases the pressure of air entering the gas turbine engine and supplies this compressed air to the combustion section. The compressed air and a fuel mix and burn within one or more combustors of the combustion section and to generate high-pressure and high-temperature combustion gases. The combustion gases flow through a hot gas path defined by the turbine section before exiting the engine. In this respect, the turbine section converts energy from the combustion gases into rotational energy. This rotational energy is, in turn, used to rotate one or more shafts, which drive the compressor section and/or a fan assembly of the gas turbine engine.

In general, each combustor of the gas turbine engine includes one or more heat shields. The heat shield(s), in turn, protect one or more components of the corresponding combustor from the combustion gases generated therein. For example, in some embodiments, a heat shield may be positioned on the downstream end of the fuel nozzle. Additionally, other components of the combustor, such as a deflector or a flare, may have a heat shield-like configuration. Currently, heat shields used in combustors are formed from a solid piece of metal having a thermal barrier coating (TBC) deposited thereon.

Accordingly, an improved combustor for a gas turbine engine would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a combustor for a gas turbine engine. The gas turbine engine, in turn, defines a longitudinal centerline and a radial direction extending orthogonally outward from the longitudinal centerline. The combustor includes an inner liner and an outer liner positioned outward of the inner liner along the radial direction such that a combustion chamber is defined between the inner and outer liners. Furthermore, the combustor includes a fuel nozzle configured to supply fuel to the combustion chamber. Moreover, the combustor includes a bristle pack having a base plate and a plurality of bristles extending outward from the base plate such that the bristle pack forms at least a portion of at least one of a heat shield coupled to the fuel nozzle, a deflector of the combustor, or a flare of the combustor.

In another aspect, the present subject matter is directed to a gas turbine engine defining a longitudinal centerline and a radial direction extending orthogonally outward from the longitudinal centerline. The gas turbine engine includes a compressor, a turbine, and a combustor. The combustor, in turn, includes an inner liner and an outer liner positioned outward of the inner liner along the radial direction such that a combustion chamber is defined between the inner and outer liners. Furthermore, the combustor includes a fuel nozzle configured to supply fuel to the combustion chamber. Additionally, the combustor includes a bristle pack having a base plate and a plurality of bristles extending outward from the base plate such that the bristle pack forms at least a portion of at least one of a heat shield coupled to the fuel nozzle, a deflector of the combustor, or a flare of the combustor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

In general, the present subject matter is directed to a combustor for a gas turbine engine. As will be described below, the combustor includes an inner liner and an outer liner positioned outward of the inner liner along a radial direction such that a combustion chamber is defined between the inner and outer liners. Furthermore, the combustor includes a fuel nozzle configured to supply fuel to the combustion chamber. Additionally, the combustor includes a bristle pack having a base plate and a plurality of bristles extending outward from the base plate. In some embodiments, the plurality of bristles has a thermal barrier coating (TBC) deposited thereon.

The bristle pack forms a heat shield or other similar component within the combustor. For example, in some embodiments, such as those in which the combustor is configured as a lean-burn combustor, the bristle pack forms a heat shield positioned at a downstream end of the fuel nozzle to protect the fuel nozzle from the combustion gases within the combustion chamber. In other embodiments, the bristle pack forms at least a portion of a deflector of the combustor that protects the components of the combustor upstream of the combustion chamber. In further embodiments, such as those in which the combustor is configured as a rich-burn combustor, the bristle pack forms at least a portion of a flare of the combustor. The flare, in turn, directs the fuel and air fixture from the fuel nozzle into the combustion chamber.

The use of the bristle pack within the combustor may have one or more technical advantages. As mentioned above, the plurality of bristles of the bristle pack extends outward from the base plate within the combustor. Moreover, the bristles can deflect or otherwise move relative to each other and the base plate during thermal loading. This relative movement, in turn, allows the bristle pack to shield or otherwise protect a component(s) of the combustor from the combustion gases within the combustion chamber without the cracking or TBC spallation during thermal cycling.

Figure 1:
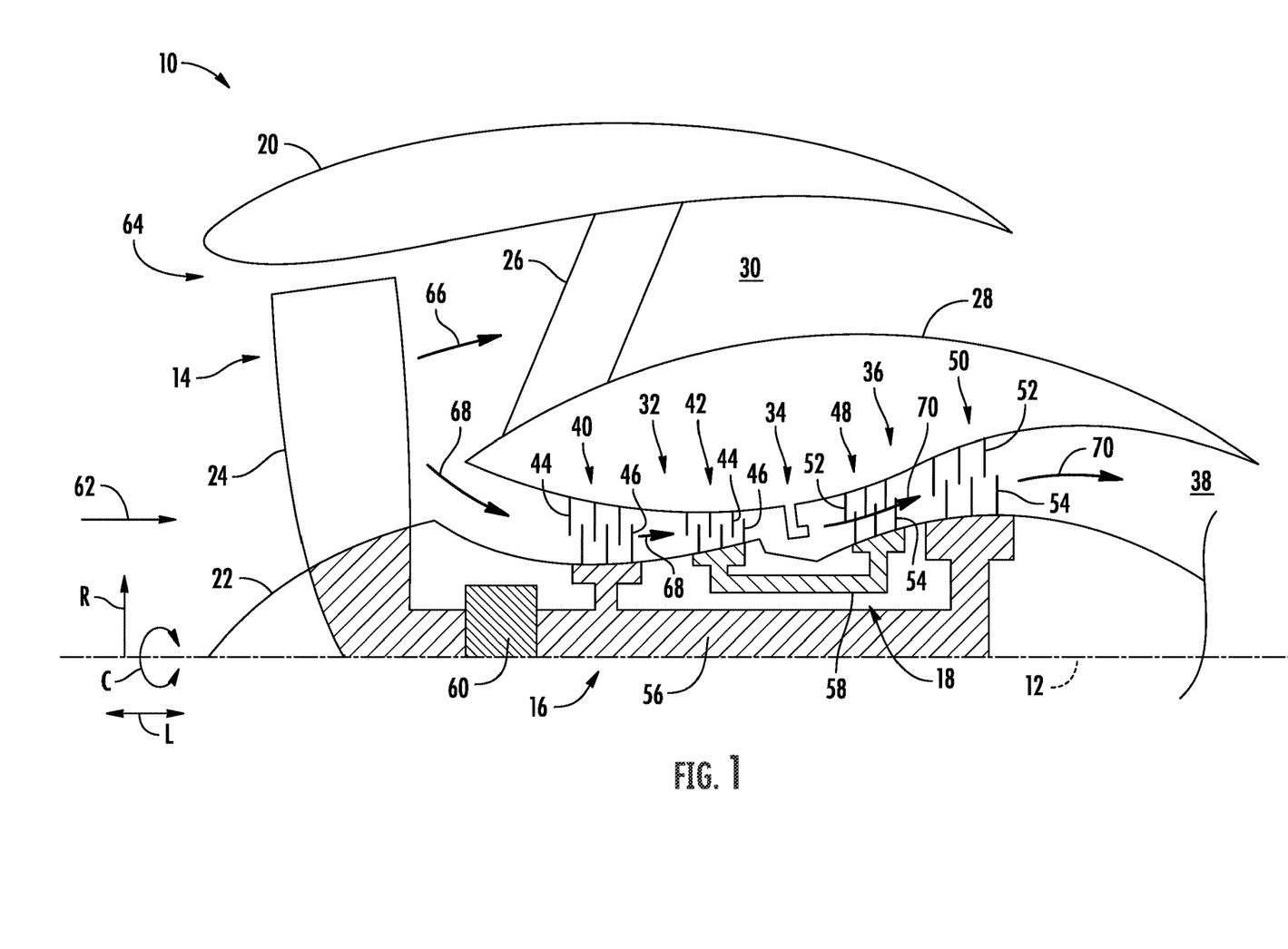
FIG. 1 is a schematic cross-sectional view of one embodiment of a gas turbine engine.

Referring now to the drawings, FIG. 1 is a schematic cross-sectional view of one embodiment of a gas turbine engine 10. In the illustrated embodiment, the engine 10 is configured as a high-bypass turbofan engine. However, in alternative embodiments, the engine 10 may be configured as a propfan engine, a turbojet engine, a turboprop engine, a turboshaft gas turbine engine, or any other suitable type of gas turbine engine.

As shown in FIG. 1, the engine 10 defines a longitudinal direction L, a radial direction R, and a circumferential direction C. In general, the longitudinal direction L extends parallel to an axial centerline 12 of the engine 10, the radial direction R extends orthogonally outward from the axial centerline 12, and the circumferential direction C extends generally concentrically around the axial centerline 12.

In general, the engine 10 includes a fan 14, a low-pressure (LP) spool 16, and a high pressure (HP) spool 18 at least partially encased by an annular nacelle 20. More specifically, the fan 14 may include a fan rotor 22 and a plurality of fan blades 24 (one is shown) coupled to the fan rotor 22. In this respect, the fan blades 24 are spaced apart from each other along the circumferential direction C and extend outward from the fan rotor 22 along the radial direction R. Moreover, the LP and HP spools 16, 18 are positioned downstream from the fan 14 along the axial centerline 12 (i.e., in the longitudinal direction L). As shown, the LP spool 16 is rotatably coupled to the fan rotor 22, thereby permitting the LP spool 16 to rotate the fan 14. Additionally, a plurality of outlet guide vanes or struts 26 spaced apart from each other in the circumferential direction C extend between an outer casing 28 surrounding the LP and HP spools 16, 18 and the nacelle 20 along the radial direction R. As such, the struts 26 support the nacelle 20 relative to the outer casing 28 such that the outer casing 28 and the nacelle 20 define a bypass airflow passage 30 positioned therebetween.

The outer casing 28 generally surrounds or encases, in serial flow order, a compressor section 32, a combustion section 34, a turbine section 36, and an exhaust section 38. For example, in some embodiments, the compressor section 32 may include a low-pressure (LP) compressor 40 of the LP spool 16 and a high-pressure (HP) compressor 42 of the HP spool 18 positioned downstream from the LP compressor 40 along the axial centerline 12. Each compressor 40, 42 may, in turn, include one or more rows of stator vanes 44 interdigitated with one or more rows of compressor rotor blades 46. Moreover, in some embodiments, the turbine section 36 includes a high-pressure (HP) turbine 48 of the HP spool 18 and a low-pressure (LP) turbine 50 of the LP spool 16 positioned downstream from the HP turbine 48 along the axial centerline 12. Each turbine 48, 50 may, in turn, include one or more rows of stator vanes 52 interdigitated with one or more rows of turbine rotor blades 54.

Additionally, the LP spool 16 includes the low-pressure (LP) shaft 56 and the HP spool 18 includes a high pressure (HP) shaft 58 positioned concentrically around the LP shaft 56. In such embodiments, the HP shaft 58 rotatably couples the rotor blades 54 of the HP turbine 48 and the rotor blades 46 of the HP compressor 42 such that rotation of the HP turbine rotor blades 54 rotatably drives HP compressor rotor blades 46. As shown, the LP shaft 56 is directly coupled to the rotor blades 54 of the LP turbine 50 and the rotor blades 46 of the LP compressor 40. Furthermore, the LP shaft 56 is coupled to the fan 14 via a gearbox 60. In this respect, the rotation of the LP turbine rotor blades 54 rotatably drives the LP compressor rotor blades 46 and the fan blades 24.

In several embodiments, the engine 10 may generate thrust to propel an aircraft. More specifically, during operation, air (indicated by arrow 62) enters an inlet portion 64 of the engine 10. The fan 14 supplies a first portion (indicated by arrow 66) of the air 62 to the bypass airflow passage 30 and a second portion (indicated by arrow 68) of the air 62 to the compressor section 32. The second portion 68 of the air 62 first flows through the LP compressor 40 in which the rotor blades 46 therein progressively compress the second portion 68 of the air 62. Next, the second portion 68 of the air 62 flows through the HP compressor 42 in which the rotor blades 46 therein continue progressively compressing the second portion 68 of the air 62. The compressed second portion 68 of the air 62 is subsequently delivered to the combustion section 34. In the combustion section 34, the second portion 68 of the air 62 mixes with fuel and burns to generate high-temperature and high-pressure combustion gases 70. Thereafter, the combustion gases 70 flow through the HP turbine 48 which the HP turbine rotor blades 54 extract a first portion of kinetic and/or thermal energy therefrom. This energy extraction rotates the HP shaft 58, thereby driving the HP compressor 42. The combustion gases 70 then flow through the LP turbine 50 in which the LP turbine rotor blades 54 extract a second portion of kinetic and/or thermal energy therefrom. This energy extraction rotates the LP shaft 56, thereby driving the LP compressor 40 and the fan 14 via the gearbox 60. The combustion gases 70 then exit the engine 10 through the exhaust section 38.

The configuration of the gas turbine engine 10 described above and shown in FIG. 1 is provided only to place the present subject matter in an exemplary field of use. Thus, the present subject matter may be readily adaptable to any manner of gas turbine engine configuration, including other types of aviation-based gas turbine engines, marine-based gas turbine engines, and/or land-based/industrial gas turbine engines.

Figure 2:
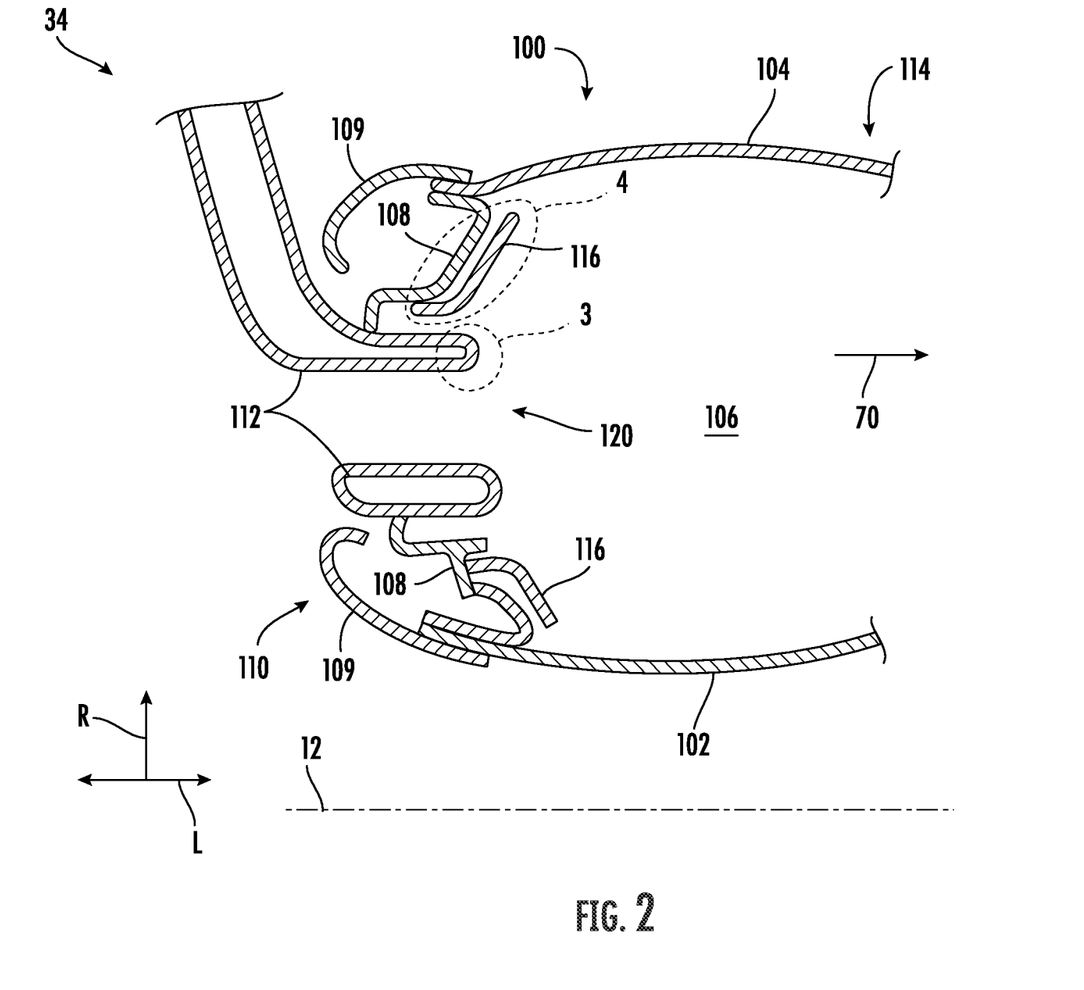
FIG. 2 is a simplified cross-sectional view of one embodiment of a combustion section of a gas turbine engine.

FIG. 2 illustrates one embodiment of a combustion section 34 of a gas turbine engine. More specifically, as shown, the combustion section 34 includes a combustor 100. In the illustrated embodiment, the combustor 100 is configured as an annular-type lean burn combustor. However, in alternative embodiments, the combustion section 34 may include any other suitable number and or type of combustors.

In general, the combustor 100 includes various components that allow for combustion of a fuel and air mixture. Specifically, in several embodiments, the combustor 100 includes an inner liner 102 and an outer liner 104 positioned outward of the inner liner 102 along the radial direction R. As such, a combustion chamber 106 in which the fuel and air mixture burns is defined between the inner and outer liners 102, 104. In one embodiment, the combustor 100 includes a cowl 109 extending upstream from the inner and outer liners 102, 104. Moreover, the combustor 100 includes a dome plate 108 positioned at the upstream end 110 of the combustor 100 such that the dome plate 108 defines the upstream end of the combustion chamber 106. Additionally, the combustor 100 includes a plurality of fuel nozzles 112 (one is shown) arranged circumferentially around the combustor 100. In this respect, the fuel nozzles 112 supply fuel and air to the combustion chamber 106. The fuel and air mix and burn within the combustion chamber 106 to generate combustion gases 70, which flow toward a downstream end 114 of the combustor 100 and into the turbine section 36 (FIG. 1).

Furthermore, in several embodiments, the combustor 100 includes a deflector 116. In general, the deflector 116 is configured to shield or otherwise protect the dome plate 108 from the combustion gases 70 present within the combustion chamber 106. In this respect, the deflector 70 may be coupled to and/or positioned downstream of the dome plate 108. As will be described below, in some embodiments, at least a portion of the deflector 116 may be formed from a bristle pack.

Figure 3:
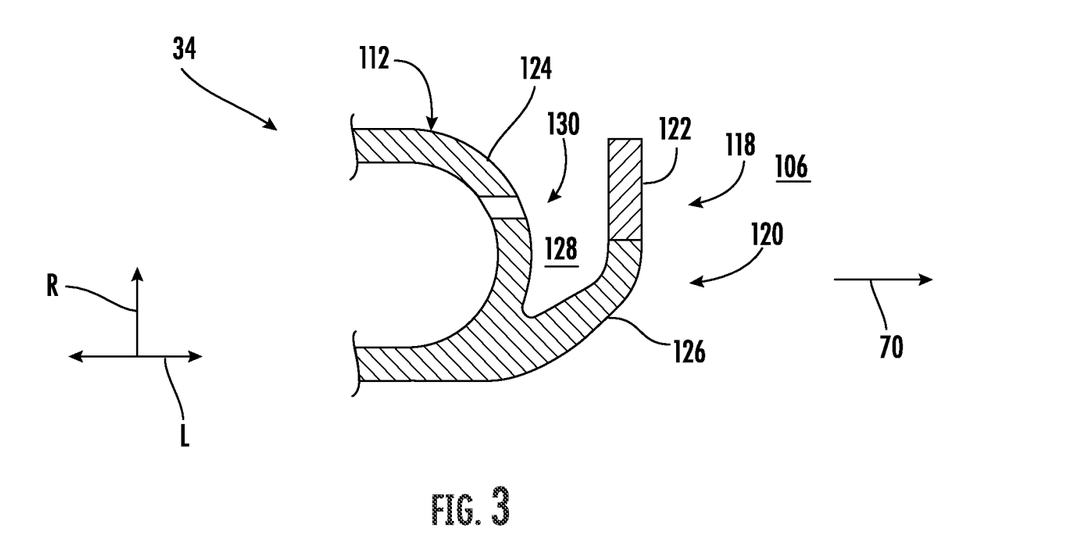
FIG. 3 is an enlarged cross-sectional view of the portion of the combustion section shown within circle 3 in FIG. 2.
Figure 4:
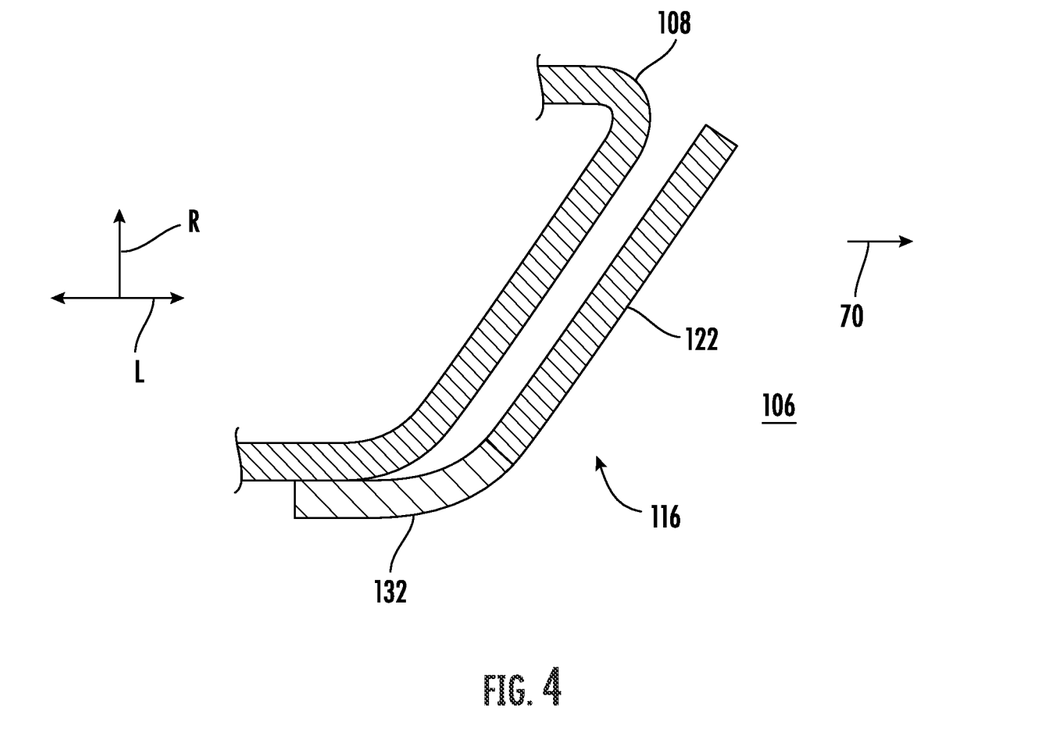
FIG. 4 is an enlarged cross-sectional view of the portion of the combustion section shown within circle 4 in FIG. 2.

Referring now to FIGS. 3 and 4, in several embodiments, the combustor 100 includes a heat shield 118 positioned at a downstream end 120 of the fuel nozzle 112. In general, the heat shield 118 is configured to shield or otherwise protect the fuel nozzle 112 from the combustion gases 70 present within the combustion chamber 106. In some embodiments, the heat shield 118 is at least partially formed by a bristle pack 122. In such embodiments, the fuel nozzle 112 includes a body 124 and a projection 126 extending downstream from the body 124 at its downstream end 120. The bristle pack 122 is coupled to (e.g., via brazing) and extends outward along the radial direction R from the projection 126 such that the bristle pack 122 is positioned downstream of the fuel nozzle body 124. In one embodiment, a cavity 128 is defined between the fuel nozzle body 124 and the bristle pack 122. In such an embodiment, the body 124 may define a cooling passage 130 through which cooling air is provided to the cavity 128 and the upstream side of the bristle pack 122.

Referring now to FIG. 4, as mentioned above, in some embodiments, the deflector 116 is at least partially formed by a bristle pack 122. Specifically, in such embodiments, the deflector 116 includes a deflector base member 132 coupled to the dome plate 108. In this respect, the bristle pack 122 is coupled to (e.g., via brazing) and extends outward along the radial direction R and downstream along the longitudinal direction L from the base member 132. As such, the bristle pack 122 is positioned between the dome plate 108 and the combustion gases 70 present within the combustion chamber 106.

Figure 5:
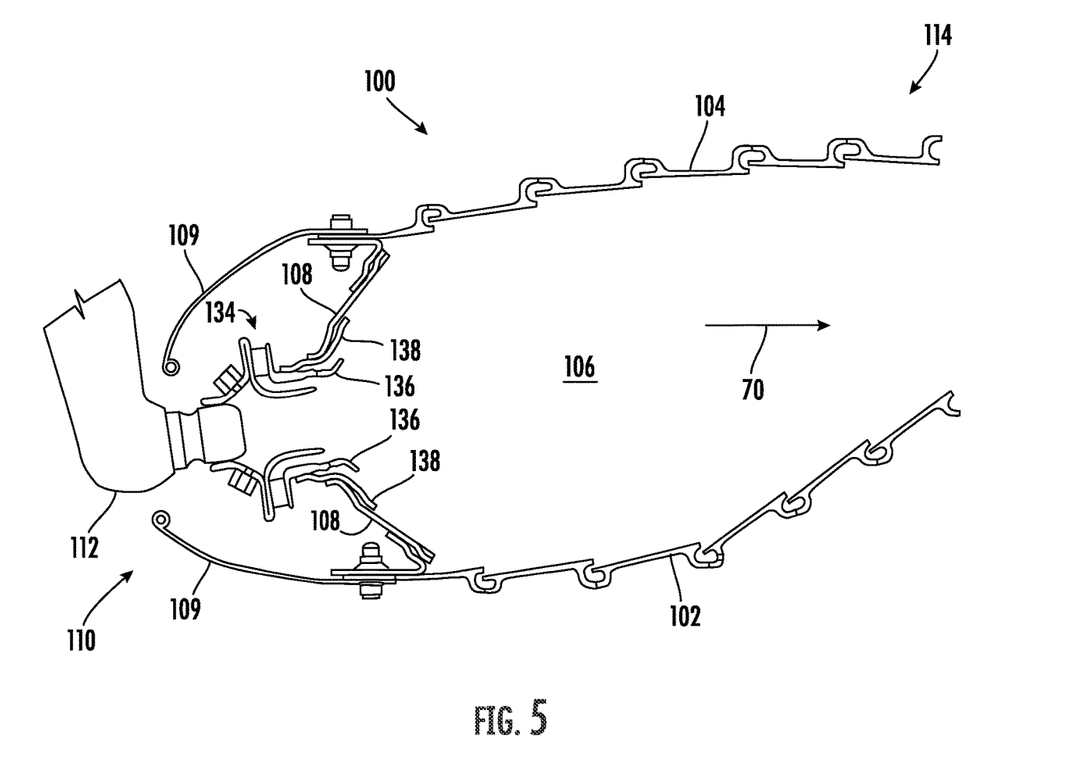
FIG. 5 is a simplified cross-sectional view of another embodiment of a combustion section of a gas turbine engine.

FIG. 5 illustrates another embodiment of a combustion section 34 of a gas turbine engine. Like the combustion section 34 shown in FIG. 2, the embodiment of the combustion section 34 shown in FIG. 5 includes an annular-type combustor 100 having inner and outer liners 102, 104 defining a combustion chamber 106 therebetween. Moreover, like the combustion section 34 shown in FIG. 2, the embodiment of the combustion section 34 shown in FIG. 5 includes a dome plate 108 and a fuel nozzle 112. However, unlike the combustion section 34 shown in FIG. 2, in the embodiment of the combustion section 34 shown in FIG. 5, the combustor 100 is configured as a rich-burn combustor. As such, the combustor 100 includes a swirler 134 coupled to the fuel nozzle 112. The swirler 134, in turn, is configured to mix air and fuel for delivery to the combustion chamber 106.

In some embodiments, the swirler 134 includes a flare 136 and a deflector 138. More specifically, the flare 136 is configured to direct the air and fuel mixture into the combustion chamber 106. In this respect, the flare 136 may have an annular cone-like shape. As will be described below, in some embodiments, at least a portion of the flare 136 is formed from a bristle pack. Additionally, like the deflector 116 shown in FIG. 2, the deflector 138 shown in FIG. 5 is configured to shield or otherwise protect the fuel nozzle 112 from the combustion gases 70 present within the combustion chamber 106. As shown, the deflector 138 is positioned outward from the flare 136 along the radial direction R. Additionally, like the deflector 116 shown in FIG. 2, in some embodiments, at least a portion of the deflector 138 shown in FIG. 5 formed from a bristle pack. For example, the deflector 138 may have a similar construction to the deflector 116 shown in FIG. 4.

Figure 6:
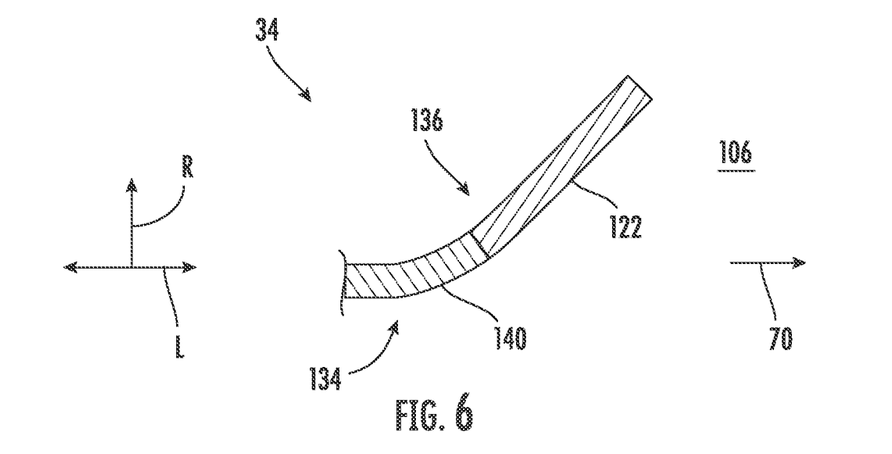
FIG. 6 is an enlarged cross-sectional view of the portion of the combustion section shown within circle 6 in FIG. 5.

Referring now to FIG. 6, as mentioned above, in some embodiments, the flare 136 is at least partially formed by a bristle pack 122. Specifically, in such embodiments, the swirler 134 includes a body 140. In this respect, the bristle pack 122 is coupled to (e.g., via brazing) and extends outward along the radial direction R and downstream along the longitudinal direction L from the swirler body 140. As such, the bristle pack 122 is positioned the swirler body 140 and the combustion gases 70 present within the combustion chamber 106.

Figure 7:
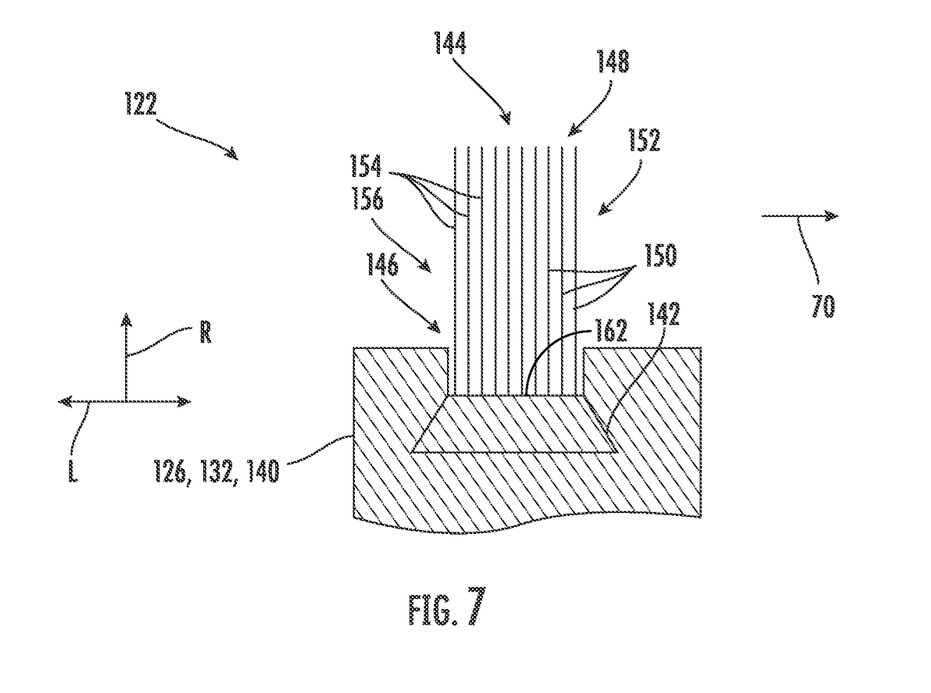
FIG. 7 is a cross-sectional side view of one embodiment of a bristle pack suitable for use in a combustor of a gas turbine engine.

FIG. 7 is a cross-sectional side view of one embodiment of a bristle pack 122 suitable for use in the combustor 100 of a gas turbine engine. As described above, the bristle pack 122 forms at least a portion of at least one of the deflectors 116, 138; the heat shield 118, or the flare 136. In this respect, the bristle pack 122 includes a base plate 142 and a plurality of bristles 144 extending outward from the base plate 142, such as in the radial direction R. The base plate 142 may, in turn, be coupled to (e.g., via brazing) to the fuel nozzle projection 126, the deflector base member 132, or the swirler body 140. Additionally, as shown, the plurality of bristles 144 includes a proximal end 146 coupled to the base plate 142 and a distal end 148 positioned distal to the base plate 142.

In some embodiments, the plurality of bristles 144 may include a first portion 150 of the bristles 144 located at a downstream end 152 (i.e., relative to the direction of flow of the combustion gases 70) of the bristle pack 122. As such, the first portion 150 of the bristles 144 may be directly exposed to the combustion gases 70 within the combustion chamber 106. Additionally, in such embodiments, the plurality of bristles 144 may include a second portion 154 of bristles 144 located at an upstream end 156 (i.e., relative to the direction of flow of the combustion gases 70) of the bristle pack 122. Thus, the second portion 154 of the bristles 144 may be distal to the combustion gases 70 within the combustion chamber 106. In this respect, the first and second portions 150, 154 of the bristles 144 may, in some embodiments, have different characteristics (e.g., diameters, materials, etc.).

Figure 8:
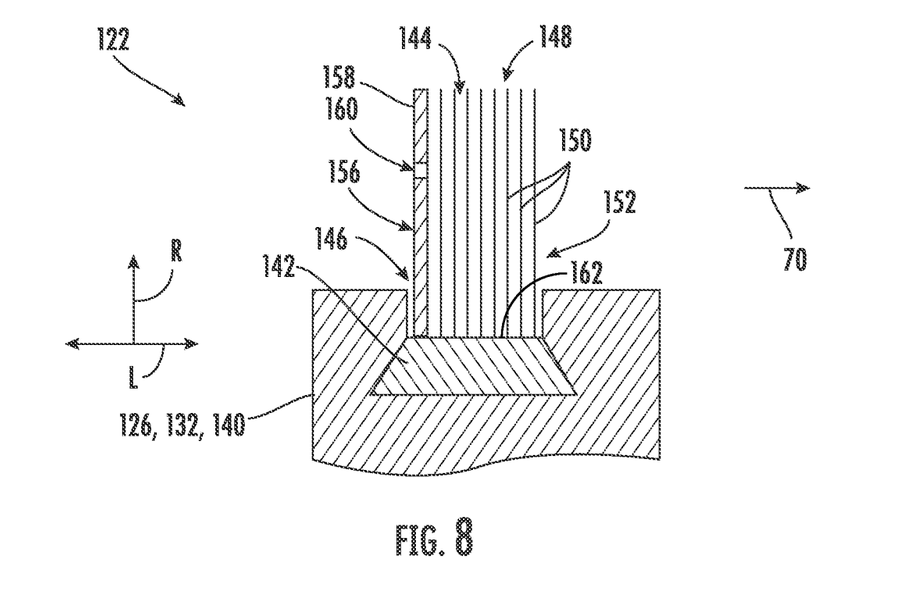
FIG. 8 is a cross-sectional side view of another embodiment of a bristle pack suitable for use in a combustor of a gas turbine engine.

FIG. 8 is a cross-sectional side view of another embodiment of a bristle pack 122 suitable for use in the combustor 100 of a gas turbine engine. Like the bristle pack 122 shown in FIG. 7, the embodiment of the bristle pack 122 shown in FIG. 8 includes a base plate 142 and a plurality of bristles 144 extending outward from the base plate 142, such as in the radial direction R. However, unlike the bristle pack 122 shown in FIG. 7, the embodiment of the bristle pack 122 shown in FIG. 8 includes a back plate 158 positioned at the upstream end 156 of the bush seal 122. In general, the back plate 158 is configured to provide support to the bristles 144. As such, the back plate 158 extends outward from the base plate 142, such as in the radial direction R, and is positioned forward of the bristles 144 relative to a direction of flow of the combustion gases 70. In one embodiment, the back plate 158 may be configured as a suitable metallic plate. However, in alternative embodiments, the back plate 158 may be configured in any other suitable manner.

Figure 9:
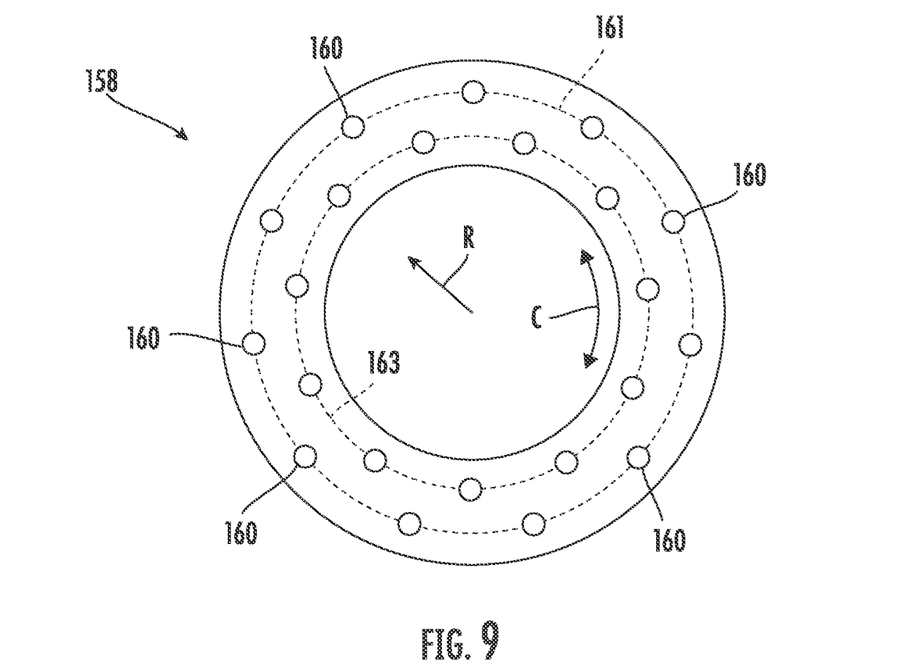
FIG. 9 is a front view of one embodiment of a back plate suitable for use within the bristle pack shown in FIG. 8.

In one embodiment, the back plate 158 defines one or more cooling holes 160. In general, the cooling hole(s) 160 allows cooling air to be supplied to the upstream side 156 of the plurality of the bristles 144. For example, in an embodiment in which the bristle pack 122 forms the heat shield 118 (FIG. 3), cooling air from the cavity 128 may flow through the cooling hole(s) 160 and onto the upstream side 156 of the bristles 144. In this respect, as shown in FIG. 9, in some embodiments, a plurality of cooling holes 160 are arranged along the circumferential direction C. For example, in the embodiment illustrated in FIG. 9, the cooling holes 160 are arranged in first and second circumferential rows (indicated by dashed lines 161 and 163, respectively). Moreover, in such an embodiment, the cooling holes 160 in the first row 161 may be staggered relative to the cooling holes 160 in the second row 163 in the circumferential direction C. However, in alternative embodiments, the cooling holes 160 may be arranged in any other suitable manner. Additionally, in other embodiments, the cooling hole(s) 160 may deliver cooling air from any other suitable source to the bristles 144. Moreover, in some embodiments, the back plate 158 may be devoid of any cooling holes 160.

The plurality of bristles 144 may have any suitable diameters. In general, the bristles 144 may be between three and ten thousandths of an inch in diameter. In one embodiment, all of the bristles 144 may have a uniform diameter. In other embodiments, the bristles 144 may have varying diameters. Specifically, in some embodiments, the first portion 150 of the bristles 144 has a first diameter and the second portion 154 of the bristles 144 has a second diameter, with the first diameter being different than the second diameter. For example, in one embodiment, the first portion 150 of the bristles 144 has a greater diameter than the second portion 155 of the bristles 144 to accommodate the greater thermal loads experienced by the first portion 150 of the bristles 144 due to the closer proximity to the combustion gases 70.

Moreover, the plurality of bristles 144 may be formed from any suitable materials, such as N2 nickel alloy. In one embodiment, all of the bristles 144 may be formed from the same material. In other embodiments, the bristles 144 may be formed from different materials. Specifically, in some embodiments, the first portion 150 of the bristles 144 may be formed from a first material and the second portion 154 of the bristles 144 may be formed from a second material, with the first material being different than the second material. For example, in one embodiment, the first portion 150 of the bristles 144 are formed from stronger material than the second portion 155 of the bristles 144 to accommodate the greater thermal loads experienced by the first portion 150 of the bristles 144 due to the closer proximity to the combustion gases 70.

In several embodiments, the plurality of bristles 144 has a thermal barrier coating (TBC) deposited thereon. In one embodiment, all of the bristles 144 have a TBC deposited thereon. In other embodiments, only some the bristles 144 have a TBC deposited thereon. For example, in one embodiment, the first portion 150 of the bristles 144 have a TBC deposited thereon and the second portion 155 of the bristles 144 do not.

Figure 10:
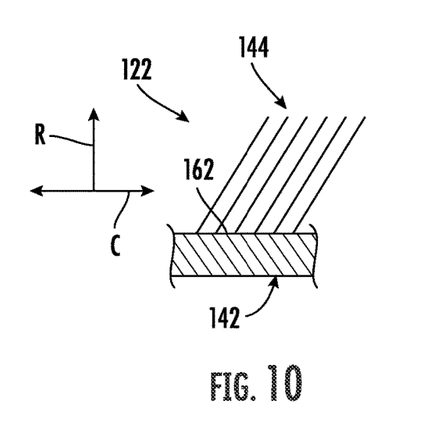
FIG. 10 is a cross-sectional side view of yet another embodiment of a bristle pack suitable for use in a combustor of a gas turbine engine.
Figure 11:
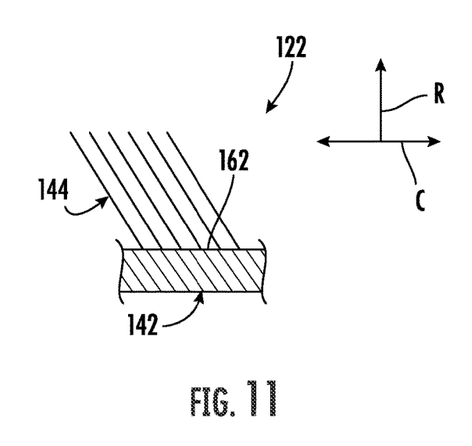
FIG. 11 is a cross-sectional side view of yet a further embodiment of a bristle pack suitable for use in a combustor of a gas turbine engine.
Figure 12:
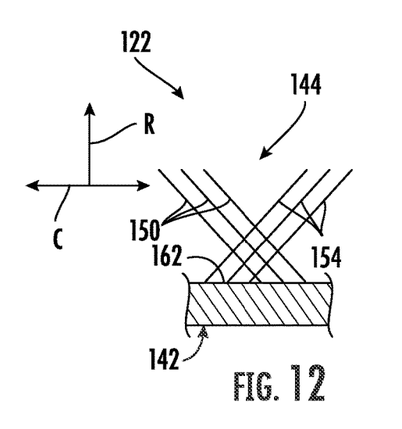
FIG. 12 is a cross-sectional side view of another embodiment of a bristle pack suitable for use in a combustor of a gas turbine engine.

Additionally, the plurality of bristles 144 may have any suitable orientation. Specifically, as shown in FIGS. 7 and 8, in several embodiments, the bristles 144 extend outward from a surface 162 of the base plate 142 at a right angle. In other embodiments, the bristles 144 extend outward from the surface 162 at an oblique angle. For example, as shown in FIG. 10, in one embodiment, all of the bristles 144 extend outward from the surface 162 such that the bristles 144 are angled in a first circumferential direction. In another embodiment, as shown in FIG. 11, all of the bristles 144 extend outward from the surface 162 such that the bristles 144 are angled in a second circumferential direction. Moreover, in a further embodiment, as shown in FIG. 12, the first portion 150 of the bristles 144 are angled in the first circumferential direction and the second portion 155 of the bristles 144 are angled in a second circumferential direction.

Figure 13:
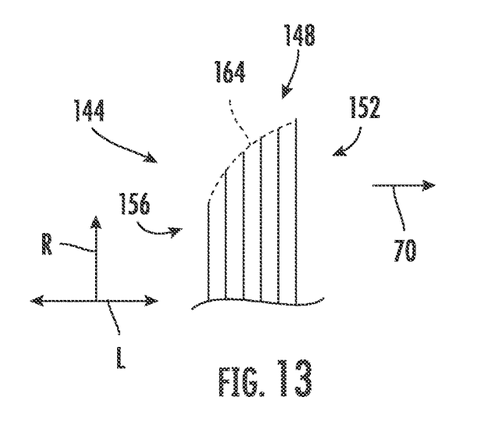
FIG. 13 is a side view of one embodiment of a distal end of a plurality of bristles of a bristle pack suitable use in a combustor of a gas turbine engine.
Figure 14:
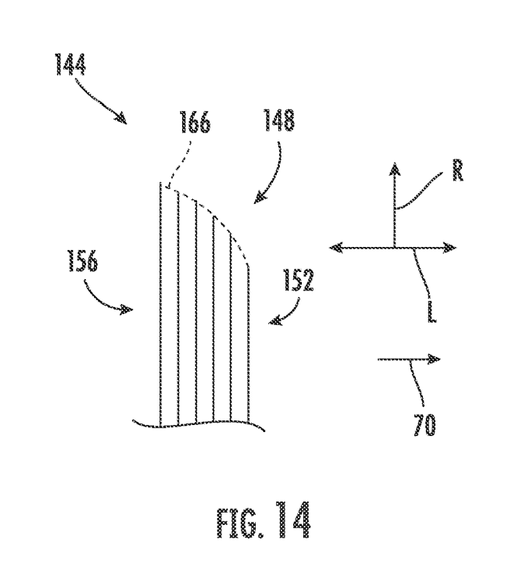
FIG. 14 is a side view of another embodiment of a distal end of a plurality of bristles of a bristle pack suitable use in a combustor of a gas turbine engine.
Figure 15:
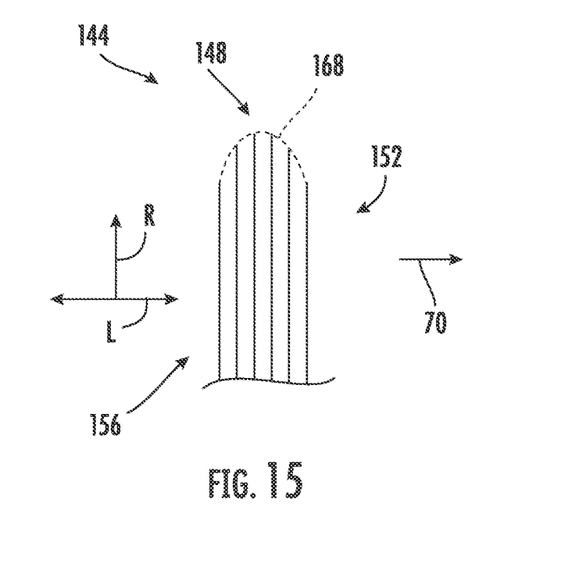
FIG. 15 is a side view of a further embodiment of a distal end of a plurality of bristles of a bristle pack suitable use in a combustor of a gas turbine engine.

Furthermore, the distal ends 148 of the plurality of bristles 144 may have any suitable profile. Specifically, as shown in FIGS. 7 and 8, in several embodiments, the distal ends 148 of the bristles 144 have a flat or planar profile in the longitudinal direction L. In other embodiments, the distal ends 148 of the bristles 144 have a curved or rounded profile along the longitudinal direction L. For example, as shown in FIG. 13, in one embodiment, the distal ends 148 of the bristles 144 have a fillet-like profile (indicated by dashed line 164) along the longitudinal direction L, with the upstream bristles 144 being shorter than the downstream bristles 144. In another embodiment, as shown in FIG. 14, the distal ends 148 of the bristles 144 have a fillet-like profile (indicated by dashed line 166) along the longitudinal direction L, with the upstream bristles 144 being longer than the downstream bristles 144. Moreover, in a further embodiment, as shown in FIG. 15, the distal ends 148 of the bristles 144 have a semi-circular profile (indicated by dashed line 168) along the longitudinal direction L.

In addition, the bristle pack 122 may be formed or manufactured using any suitable manufacturing process(es) or technique(s). For example, the bristle pack 122 may be additively manufactured, electroformed, and/or the like.

The use of the bristle pack 122 within the combustor 100, namely as at least portion of the deflector 116, 138; the heat shield 118; and/or the flare 136, may provide one or more technical advantages. As mentioned above, the plurality of bristles 144 of the bristle pack 122 extends outward from the base plate 142 within the combustor 100. Moreover, the bristles 144 can deflect or otherwise move relative to each other and the base plate 142 during thermal loading. This relative movement, in turn, allows the bristle pack 122 to shield or otherwise protect a component(s) (e.g., the dome plate 108, the fuel nozzle 112, and/or the swirler 134) of the combustor 100 from the combustion gases 70 within the combustion chamber 106 without the cracking or TBC spallation that can occur with conventional heat shields or other similar components (e.g., deflectors, flare, etc.) used in combustors.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A combustor for a gas turbine engine, the gas turbine engine defining a longitudinal centerline and a radial direction extending orthogonally outward from the longitudinal centerline, the combustor comprising: an inner liner; an outer liner positioned outward of the inner liner along the radial direction such that a combustion chamber is defined between the inner and outer liners; a fuel nozzle configured to supply fuel to the combustion chamber; and a bristle pack including a base plate and a plurality of bristles extending outward from the base plate such that the bristle pack forms at least a portion of at least one of a heat shield coupled to the fuel nozzle, a deflector of the combustor, or a flare of the combustor.

The combustor of one or more of these clauses, wherein the bristle pack forms at least a portion of the heat shield.

The combustor of one or more of these clauses, wherein the bristle pack forms at least a portion of the deflector.

The combustor of one or more of these clauses, wherein the bristle pack forms at least a portion of the flare.

The combustor of one or more of these clauses, wherein the bristle pack further includes a back plate extending outward from the base plate and positioned forward of the plurality of bristles relative to a direction of flow through the gas turbine engine.

The combustor of one or more of these clauses, wherein the back plate defines a cooling hole through which cooling air is supplied to the plurality of the bristles.

The combustor of one or more of these clauses, wherein the plurality of bristles extends outward from a surface of the base plate at a right angle.

The combustor of one or more of these clauses, wherein the plurality of bristles extends outward from a surface of the base plate at an oblique angle.

The combustor of one or more of these clauses, wherein the plurality of bristles has a proximal end coupled to the base plate and a distal end positioned distal to the base plate, the distal end having a rounded profile.

The combustor of one or more of these clauses, wherein all of the plurality of bristles comprises a thermal barrier coating.

The combustor of one or more of these clauses, wherein a first portion of the plurality of bristles comprises a thermal barrier coating and a second portion of the plurality of bristles is devoid of the thermal barrier coating.

The combustor of one or more of these clauses, wherein the plurality of bristles has a uniform diameter.

The combustor of one or more of these clauses, wherein a first portion of the plurality of bristles have a first diameter and a second portion of the plurality of bristles have a second diameter, the first diameter being different than the second diameter.

The combustor of one or more of these clauses, wherein all of the plurality of bristles are formed from the same material.

The combustor of one or more of these clauses, wherein a first portion of the plurality of bristles are formed a first material and a second portion of the plurality of bristles formed from a second material, the first material being different than the second material.

A gas turbine engine defining a longitudinal centerline and a radial direction extending orthogonally outward from the longitudinal centerline, the gas turbine engine comprising: a compressor; a turbine; and a combustor comprising: an inner liner; an outer liner positioned outward of the inner liner along the radial direction such that a combustion chamber is defined between the inner and outer liners; a fuel nozzle configured to supply fuel to the combustion chamber; and a bristle pack including a base plate and a plurality of bristles extending outward from the base plate such that the bristle pack forms at least a portion of at least one of a heat shield coupled to the fuel nozzle, a deflector of the combustor, or a flare of the combustor.

The gas turbine engine of one or more of these clauses, wherein the bristle pack forms at least a portion of the heat shield.

The gas turbine engine of one or more of these clauses, wherein the bristle pack forms at least a portion of the deflector.

The gas turbine engine of one or more of these clauses, wherein the bristle pack forms at least a portion of the flare.

The gas turbine engine of one or more of these clauses, wherein the bristle pack further includes a back plate extending outward from the base plate and positioned forward of the plurality of bristles relative to a direction of flow through the gas turbine engine.

What is claimed is:

1. A combustor for a gas turbine engine, the gas turbine engine defining a circumferential direction, a longitudinal centerline, and a radial direction extending orthogonally outward from the longitudinal centerline, the combustor comprising:
   an inner liner;
   an outer liner positioned outward of the inner liner along the radial direction such that a combustion chamber is defined between the inner liner and the outer liner;
   a fuel nozzle configured to supply fuel to the combustion chamber to generate a flow of combustion gases; and
   a bristle pack including:
      a base plate; and
      a plurality of bristles extending radially outward from the base plate such that the bristle pack forms at least a portion of at least one of a heat shield coupled to the fuel nozzle, a deflector of the combustor, or a flare of the combustor,
      wherein the plurality of bristles includes a first portion located at a downstream end of the bristle pack, relative to the flow of combustion gases, and a second portion located at an upstream end of the bristle pack, relative to the flow of combustion gases, and wherein the first portion is directly exposed to the flow of combustion gases within the combustion chamber and the second portion is distal to the flow of combustion gases within the combustion chamber, and
      each of the plurality of bristles includes a fixed proximal end coupled to the base plate and a free distal end extending towards the combustion chamber.

2. The combustor of claim 1, wherein the bristle pack forms at least a portion of the heat shield.

3. The combustor of claim 1, wherein the bristle pack forms at least a portion of the deflector.

4. The combustor of claim 1, wherein the bristle pack forms at least a portion of the flare.

5. The combustor of claim 1, wherein the bristle pack further includes a back plate extending radially outward from the base plate and positioned forward of the plurality of bristles relative to a direction of flow through the gas turbine engine.

6. The combustor of claim 5, wherein the back plate defines one or more cooling holes through which cooling air is supplied to an upstream side of the plurality of the bristles.

7. The combustor of claim 1, wherein the plurality of bristles extends outward from a surface of the base plate at a right angle.

8. The combustor of claim 1, wherein the plurality of bristles extends outward from a surface of the base plate at an oblique angle.

9. The combustor of claim 1, wherein the free distal end is positioned distal to the base plate, the free distal end having a rounded profile.

10. The combustor of claim 1, wherein all of the plurality of bristles comprises a thermal barrier coating.

11. The combustor of claim 1, wherein the first portion of the plurality of bristles comprises a thermal barrier coating and the second portion of the plurality of bristles is devoid of the thermal barrier coating.

12. The combustor of claim 1, wherein the plurality of bristles has a uniform diameter.

13. The combustor of claim 1, wherein the first portion of the plurality of bristles have a first diameter and the second portion of the plurality of bristles have a second diameter, the first diameter being different than the second diameter.

14. The combustor of claim 1, wherein all of the plurality of bristles are formed from the same material.

15. The combustor of claim 1, wherein the first portion of the plurality of bristles are formed a first material and the second portion of the plurality of bristles formed from a second material, the first material being different than the second material.

16. A gas turbine engine defining a circumferential direction, a longitudinal centerline, and a radial direction extending orthogonally outward from the longitudinal centerline, the gas turbine engine comprising:
   a compressor;
   a turbine; and
   a combustor comprising:
      an inner liner;
      an outer liner positioned outward of the inner liner along the radial direction such that a combustion chamber is defined between the inner liner and the outer liner;
      a fuel nozzle configured to supply fuel to the combustion chamber to generate a flow of combustion gases; and
      a bristle pack including:
         a base plate; and
         a plurality of bristles extending radially outward from the base plate such that the bristle pack forms at least a portion of at least one of a heat shield coupled to the fuel nozzle, a deflector of the combustor, or a flare of the combustor,
         wherein the plurality of bristles includes a first portion located at a downstream end of the bristle pack, relative to the flow of combustion gases, and a second portion located at an upstream end of the bristle pack, relative to the flow of combustion gases, and wherein the first portion is directly exposed to the flow of combustion gases within the combustion chamber and the second portion is distal to the flow of combustion gases within the combustion chamber, and
         each of the plurality of bristles includes a fixed proximal end coupled to the base plate and a free distal end extending towards the combustion chamber.

17. The gas turbine engine of claim 16, wherein the bristle pack forms at least a portion of the heat shield.

18. The gas turbine engine of claim 16, wherein the bristle pack forms at least a portion of the deflector.

19. The gas turbine engine of claim 16, wherein the bristle pack forms at least a portion of the flare.

20. The gas turbine engine of claim 16, wherein the bristle pack further includes a back plate extending radially outward from the base plate and positioned forward of the plurality of bristles relative to a direction of flow through the gas turbine engine.

* * * * *